United States Patent [19]

Tominaga

[11] Patent Number: 5,069,767

[45] Date of Patent: Dec. 3, 1991

[54] METHOD OF ELECTRODEPOSITION COATING, AND WATER-BASE PAINT RESIN COMPOSITION

[75] Inventor: Akira Tominaga, Chigasaki, Japan

[73] Assignee: Kansai Paint Co., Ltd., Hyogo, Japan

[21] Appl. No.: 439,000

[22] Filed: Nov. 22, 1989

Related U.S. Application Data

[63] Continuation of Ser. No. 135,305, Dec. 21, 1987, abandoned.

[30] Foreign Application Priority Data

Dec. 23, 1986 [JP] Japan ............................... 61-305457
Dec. 23, 1986 [JP] Japan ............................... 61-305458

[51] Int. Cl.$^5$ .............................................. C25D 13/04
[52] U.S. Cl. .................................. 204/181.7; 523/425
[58] Field of Search ..................... 204/181.6, 181.7; 523/425; 428/413

[56] References Cited

U.S. PATENT DOCUMENTS

| | | | |
|---|---|---|---|
| 3,868,342 | 2/1975 | Magne | 523/425 |
| 4,046,729 | 9/1977 | Scriven | 204/181.7 X |
| 4,147,679 | 4/1979 | Scriven | 204/181.7 X |
| 4,491,611 | 1/1985 | Barnhoorn | 204/181.7 |

OTHER PUBLICATIONS

Derwent Accession No. 84-131347, Derwent Publications Ltd., London Abstract of Japanese No. A-5-9-067396.
Derwent Accession No. 79-30328B, Derwent Publications Ltd., London Abstract of Japanese No. A-5-4-031279.
Derwent Accession No. 86-255277, Derwent Publications Ltd., London Abstract of Japanese No. A-6-1-182940.

Primary Examiner—John Niebling
Assistant Examiner—Kishor Mayekar
Attorney, Agent, or Firm—Wenderoth, Lind & Ponack

[57] ABSTRACT

A method of electrodeposition coating which comprises electrodepositing a water-base electrodeposition coating composition comprising an ionic group-containing resin as a film-forming vehicle on an article to be coated and then heating the coated article to form a cured coated film; wherein the ionic group-containing resin contains a functional group selected from the group consisting of hydroxysilane and alkoxysilane groups, and can be cross-linked by the condensation reaction of the functional group, and a resin composition for a water-base paint, said composition comprising a resin containing a cationic group and a functional group selected from hydroxysilane and alkoxysilane groups as a film-forming vehicle.

14 Claims, No Drawings

METHOD OF ELECTRODEPOSITION COATING, AND WATER-BASE PAINT RESIN COMPOSITION

This application is a continuation of now abandoned application Ser. No. 135,305, filed Dec. 21, 1987.

This invention relates to a novel method of electrodeposition coating, particularly a method of electrodeposition coating which permits low-temperature curing, and to a water-base paint resin composition which can be used advantageously in the above method.

Previously proposed methods of electrodeposition coating which form coated films capable of being cured at low temperatures of about 120° to 140° C. include, for example, those in which resins containing both a cationic group and a blocked isocyanate functional group capable of being dissociated at low temperatures are used (U.S. Pat. Nos. 3,984,299 and 4,435,559), and those in which resins containing both a cationic group and an N-methylol functional group are used (U.S. Pat. Nos. 4,341,676 and 4,501,833). Coated films formed by low-temperature curing in these methods are insufficient in adhesiveness and corrosion resistance.

It is an object of this invention to provide an electrodeposition coating method which gives excellent low-temperature curability, bath stability, surface smoothness and film properties (adhesion, corrosion resistance, etc.) by using an-electrodeposition paint comprising a resin containing a functional group selected from hydroxysilane and alkoxysilane groups, which is of quite a different type from the resins previously used, as a film-forming vehicle.

Attempts have been made previously to improve the adhesion, weatherability and corrosion resistance of electrodeposited coated films by using a compound containing a hydroxysilane or an alkoxysilane group as a pre-treating agent (see, for example, U.S. Pat. Nos. 3,785,946 and 4,330,446). It is well known in the field of moisture-curable paints to utilize the condensation reaction of the hydroxysilane group and/or the alkoxysilane group for curing of coated films (for example, Japanese Laid-Open Patent Publications Nos. 73998/1977 and 40893/1979. As another use of an aqueous dispersion of the resin containing a hydroxysilane group and/or an alkoxysilane group, it was proposed to utilize a resin obtained by copolymerizing a vinyl or acrylic monomer containing the aforeasid functional group as a comonomer component for surface-treating inorganic building materials (Japanese Laid-Open Patent Publication No. 57860/1981).

An aqueous dispersion of such a resin containing a hydroxysilane group and/or an alkoxysilane group as a functional group was not previously thought to exist stably in a non-gelled state because of the high reactivity of the functional group. Hence, no attempt has been made to apply it to the field of electrodeposition coating. However, surprisingly in view of the prior thought, the present inventor has found that a resin containing both the above functional group and an ionic group exists stably without gellation in its self-emulsifiable aqueous dispersion and this aqueous dispersion is useful for electrodeposition coating, and that when an electrodeposited film from an electrodeposition coating bath comprising this aqueous dispersion is heated after deposition, condensation reaction proceeds with the evaporation of water and the melting of the film whereby the film is crosslinked to form a uniform coated film excellent in film properties such as adhesion, weatherability and corrosion resistance. This discovery has led to the accomplishment of the present invention.

Thus, according to this invention, there is provided a method of electrodeposition coating which comprises electrodepositing a water-base electrodeposition coating composition comprising an ionic group-containing resin as a film-forming vehicle on an article to be coated and then heating the coated article to form a cured coated film, wherein the ionic group-containing resin contains a functional group selected from the group consisting of hydroxysilane and alkoxysilane groups, and can be cross-linked by the condensation reaction of the functional group.

The present invention also provides, as a novel coating composition which can be conveniently used in the above method, a water-base coating composition comprising a resin containing a cationic group and a functional group selected from hydroxysilane and alkoxysilane groups as a film-forming vehicle (or binder).

The "hydroxysilane group" or "alkoxysilane group", as used in this specification is an organosilicon radical having at least one hydroxyl group or alkoxy group bonded to the silicon atom, and typically includes functional groups represented by the following general formula

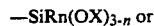

or

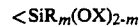

wherein R represents a hydrocarbon group such as an alkyl group having 1 to 6 carbon atoms or a phenyl group, X represents a hydrogen atom or an organic group to be described below, n represents 0 or an integer of 1 or 2, and m represents 0 or 1.

The resin containing an ionic group and the hydroxysilane and/or alkoxysilane group used as a vehicle component of the water-base electrodeposition coating composition used in this invention may be formed into a non-gelled aqueous dispersion by preparing a non-aqueous solution of the resin with or without a catalyst, and emulsifying it without keeping the non-aqueous solution in the non-emulsified state in contact with water for a long period of time. This non-gelled aqueous dispersion can be used in the electrodeposition coating method of this invention as a water-base electrodeposition coating bath.

The emulsified aqueous dispersion of the above resin can be prepared, for example, by the following methods.

(1) The non-aqueous solution of the resin, or a mixture of the resin with a neutralizing agent, is agitated by means of a disper, and during agitation, water is put into it within a short period of time to emulsify and dilute it.

(2) With agitation by means of a disper, the non-aqueous solution of the resin is gradually put into water or a mixture of water and a neutralizing agent (acid) to emulsify it (suitable for small-scale production).

(3) The non-aqueous solution of the resin or a mixture of it with a neutralizing agent and water are simultaneously fed into a pipeline mixer to emulsify it continuously (suitable for mass-production).

During emulsification and dispersion in water, at least part of the alkoxysilane groups will be hydrolyzed to hydroxysilane groups and oriented on the surface of the particles as hydrophilic groups. It is presumed that since the degree of dilution with water is high, electrostatic repulsion among the emulsion particles or hydrogen bonding to an alcohol solvent makes it possible to maintain the resulting aqueous dispersion of the resin stable without gellation. The aqueous dispersion becomes more stable in cathodic electrodeposition since the pH of the electrodeposition bath corresponds to a stable region of 4 to 7.

When a film electrodeposited from an aqueous electrodeposition coating bath comprising the so prepared aqueous dispersion of the functional group-containing resin is heated, water is volatilized and the resin is melted. Consequently, dehydration reaction or alcohol-eliminating condensation reaction takes place between hydroxysilane groups, between hydroxysilane groups and alkoxysilane groups, between alkoxysilane groups and hydroxyl groups, between hydroxysilane or alkoxysilane groups and carboxyl groups, etc. to crosslink and cure the coated film. The reaction between alkoxysilane groups and hydroxyl groups is particularly effective for curing the elecrodeposited film. To promote these reactions, it is possible, if required, to add organic metal compounds, for example carboxylates and chelate compounds of metals such as Al, Ti, V, Cr, Mn, Fe, Co, Ni, Cu, Zn, Zr, Sn, Pb and Bi as a catalyst to the resin in the preparation of the aqueous dispersion of the resin. Organic metal compounds of Ti, Fe, and Pb are especially effective as a reaction catalyst for reaction between the alkoxysilane groups and hydroxyl groups.

The reaction of crosslinking the electrodeposited film can be promoted by adding acetylacetone to the resin instead of the above catalyst. Acetylacetone forms a chelate with the metal dissolved from the article to be coated, and this chelate acts as a catalyst. The amount of acetylacetone used is 5 to 100 parts by weight, preferably 10 to 50 parts by weight, per 100 parts by weight of the resin solids.

The type of the ionic group in the ionic group-containing resin as a vehicle component for the water-base electrodeposition paint used in this invention is not particularly restricted. It may be an ordinary anionic or a cationic group which is introduced into an elecrodeposition paint resin to water-solubilize it or render it water-dispersible. For example, the anionic group may be a carboxyl group, a phosphonic acid group, or a sulfonic acid group, and the cationic group may be a primary, secondary or tertiary amino group, a quaternary ammonium salt group, a quaternary phosphonium salt group, or a tertiary sulfonium salt group. Generally, the anionic group is preferably a carboxyl group, and the cationic group is preferably a primary, secondary or tertiary amino group. The cationic group is especially preferred. These anionic or cationic groups are neutralized with a base or acid to form ionic groups.

The amount of such ionic groups is one sufficient to make the resin water-soluble or water-dispersible, and varies depending, for example, upon the type of the ionic groups. Generally, it is about 0.1 to about 2 milliequivalents per gram of dry resin, preferably about 0.2 to about 1 milliequivalent per gram of dry resin.

The method of introducing the ionic group into the base resin is not particularly restricted, and may be any method known per se. It is desirable to use methods which do not produce by-products that may possibly affect the electrodeposited films adversely. Some of such methods are described below.

Introduction of an anionic group (1) Copolymerization of a carboxyl group-containing vinyl or acrylic monomer.

(2) Esterification between a polycarboxylic acid and a hydroxyl group-containing polymer or a polyepoxide.

(3) Addition of an alpha,beta-unsaturated dicarboxylic acid to the unsaturated bonds of polybutadiene, etc.

Introduction of a cationic group (1) Addition reaction between a primary or secondary amine and a polyepoxide or a poly-alpha,beta-unsaturated carbonyl compound.

(2) Copolymerization of an amino group-containing vinyl or acrylic monomer.

(3) Condensation between a polyamine and a polycarboxylic acid.

(4) Mannich base-forming reaction with a secondary amine, formaldehyde and a phenolic compound.

(5) Addition reaction between a tertiary amino group-containing alcohol and a polyisocyanate.

(6) Addition reaction between an alcohol containing a ketimine group, an oxazolidine group or an imidazoline group and a polyepoxide (see U. K. Patent 2184124A and European Patent 220442A).

There is no particular restriction on the base resin into which an ionic group is to be introduced, and it may be chosen depending upon end uses. Desirably, the resin contains a hydroxyl group having reactivity with the hydroxysilane group or the alkoxysilane group. The amount of the hydroxyl group is generally about 0.2 to about 10 milliequivalents/gram of dry reesin, preferably 0.5 to 5 milliequivalents/gram of dry resin. For use as a primer requiring corrosion resistance, a resin having as a main component a polymer of a polyglycidyl ether of a polyphenol (so-called epoxy resin) is preferred. For use in one-coat paints requiring weatherability, acrylic resins, polyester resins, and alkyd resins, for example, are preferred. Acrylic resins are especially preferred.

The molecular weight of the base resin is not particularly limited. Generally, its number average molecular weight is about 380 to about 100,000.

Typical examples of the epoxy resin are polyglycidyl ethers of polyphenols such as bis(4-hydroxyphenyl)-2,2-propane, bis(4-hydroxyphenyl)-1,1-ethane, bis(4-hydroxyphenyl)-methane, 4,4'-dihydroxydiphenylether, 4,4'-dihydroxydiphenylsulfone, phenol novolak, cresol novolak and polymers thereof.

Preferred among them from the viewpoint of price and corrosion resistance are polyglycidyl ethers of polyphenols having a number average molecular weight of at least about 380, preferably about 800 to about 2,000, more preferably 1,000 to 1,500, and an epoxy equivalent of generally 190 to 2,000, preferably 400 to 1,000, more preferably 500 to 750.

Particularly preferred are epoxy resins of the following general formula

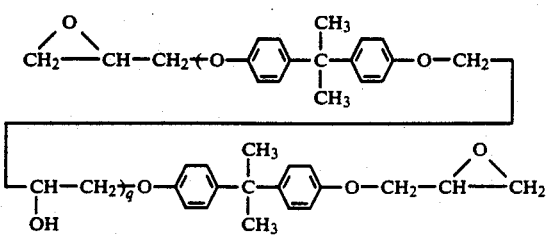

wherein q is 0 to 4.

These epoxy resins may be used singly, or after modification with plastic or elastic modifiers.

Examples of the acrylic resin are polymers or copolymers obtained by (co)polymerizing at least one acrylic monomer and as required, at least one other alpha,beta-ethylenically unsaturated monomer such as styrene, its derivatives (e.g., alpha-methylstyrene), (meth)acrylonitrile, butadiene, selected according to the method of introducing the ionic group described above. The acrylic monomer may include, for example, $C_1$–$C_{12}$ alkyl esters of (meth)acrylic acid such as methyl (meth)acrylate, ethyl (meth)acrylate, butyl (meth)acrylate, propyl (meth)acrylate and 2-ethylhexyl (meth)acrylate; $C_1$–$C_4$ hydroxyalkyl esters of (meth)acrylic acid such as hydroxyethyl (meth)acrylate and hydroxypropyl (meth)acrylate; aminoalkyl esters of (meth)acrylic acid such as aminoethyl (meth)acrylate and N,N-dimethylaminoethyl (meth)acrylate; glycdiyl (meth)acrylate; and (meth)acrylic acid.

Suitable acrylic resins have a number average molecular weight of about 3,000 to about 100,000, preferably about 4,000 to about 50,000.

If the number average molecular weight of the base resin such as the above-mentioned epoxy resin and acrylic resin is lower than the above-specified limit, the desired film properties are difficult to obtain. If it is higher than the specified limit, the base resin is difficult to disperse in water because of its high viscosity in water.

There is no particular restriction on the method of introducing the functional group selected from hydroxysilane and alkoxysilane groups into the base resin, and can be selected as desired according to the type of the functional group to be introduced, for example.

It is preferred to employ methods which do not produce by-products, such as water-soluble salts, that might adversely affect the electrodeposition coating. Some methods are described below by way of examples. The hydroxysilane group does not necessarily have to be present in the resin in advance since it can be easily obtained by hydrolysis of the alkoxysilane group.

(1) Copolymerization of an alkoxysilane group-containing vinyl or acrylic monomer. Examples of the monomer are as follows:

CH₂=CHSi(OX)₃

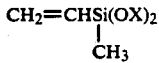
CH₂=CHSi(OX)₂
    |
    CH₃

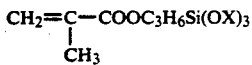
CH₂=C—COOC₃H₆Si(OX)₃
    |
    CH₃

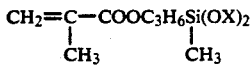
CH₂=C—COOC₃H₆Si(OX)₂
    |           |
    CH₃        CH₃

(2) Addition of an alkoxysilane group-containing amine compound to the epoxy, carboxyl or isocyanate groups in the base resin. Examples of the amine compound are as follows:

NH₂C₃H₆Si(OX)₃

NH₂CH₂CH₂NHC₃H₆Si(OX)₃

NH₂CH₂CH₂NHC₃H₆Si(OX)₂
              |
              CH₃

(3) Addition of an alkoxysilane group-containing epoxy compound to the amino groups, carboxyl groups or phenolic hydroxyl groups of the base resin or ring-opening of the above epoxy compound with a secondary amine, a carboxylic acid or a phenol and adding it to the isocyanate groups of the base resin. Examples of the epoxy compound are as follows:

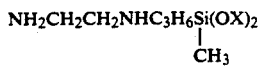

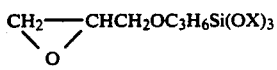

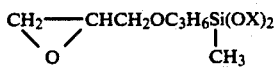

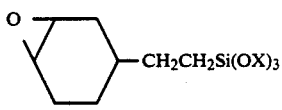

(4) Addition of an alkoxysilane group-containing isocyanate compound to the hydroxyl groups or amino groups of the base resin. Examples of the isocyanate compound are as follows:

OCNC₃H₆Si(OX)₃

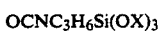
OCNC₃H₆Si(OX)₂
       |
       CH₃

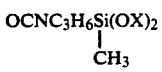

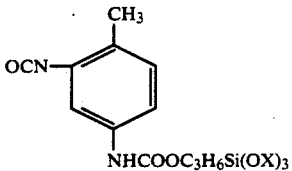

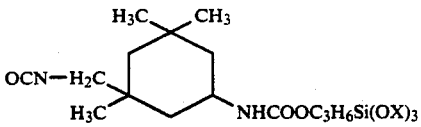

(5) Condensation of a compound or resin intermediate (polyorganosiloxane) containing at least two functional groups selected from hydroxysilane and alkoxysilane groups per molecule with itself or with the hydroxyl groups of the base resin. Examples of the compound or resin intermediate are as follows:

Si(OX)₄

CH₃—Si(OX)₃

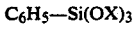
C₆H₅—Si(OX)₃

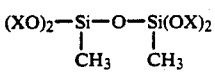
(XO)₂—Si—O—Si(OX)₂
       |        |
       CH₃     CH₃

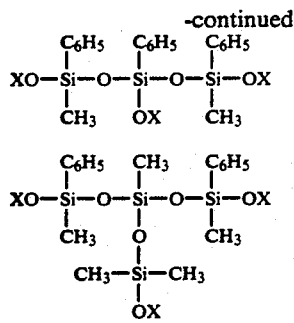

When the hydroxysilane and alkoxysilane groups are introduced via a urethane or urea linkage in the above methods of introducing the hydroxysilane and alkoxysilane groups into the base resin, a water-base paint resin composition having excellent film properties such as adhesion and corrosion resistance can be obtained.

The organic groups X in the above formulae include, for example, (i) alcohol residues such as —CH₃, —C₂H₅, —C₃H₇, —C₄H₉, —C₆H₁₃ and —C₈H₁₇, (ii) ether alcohol residues such as —C₂H₄OCH₃, —C₂H₄OC₂H₅, —C₂H₄OC₃H₇, —C₂H₄OC₄H₉, —C₃H₆OCH₃—, —C₃H₆OC₂H₅, —C₄H₈OCH₃, —C₂H₄OC₂H₄OCH₃, —C₂H₄OC₂H₄OC₂H₅, and C₂H₄OC₂H₄OC₄H₉, (iii) ester alcohol residues such as

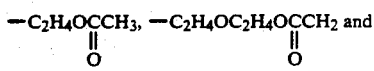

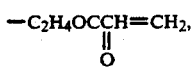

and (iv) cycloalkyl, aralkyl or heterocyclic-alkyl alcohol residues such as

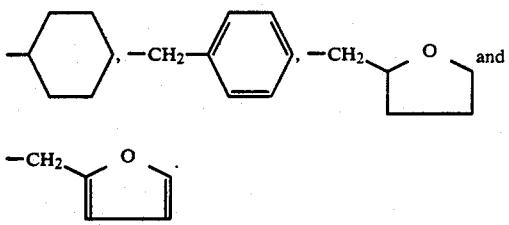

X has higher reactivity and better low-temperature curability with smaller number of carbon atoms therein. But X with less carbon atoms tend more to be condensed after hydrolysis and stability in an aqueous system is lower. The number of carbon atoms is advantageously 2 to 7 in view of balance. Alternatively, balance may be obtained by combining with those having less than 2 carbon atoms or more than 7 carbon atoms. Especially preferred alcohols are n- or iso-propanol and n-, iso- or sec-butanol.

The amount of the functional group selected from hydroxysilane and alkoxysilane groups to be introduced into the resin is one required to give a cured film having a sufficient crosslinking density by baking of the electrodeposited film. It is generally about 0.2 to 20 milliequivalents/gram of dry resin, particularly 0.5 to 5 milliequivalents/gram of dry resin.

When the amount of the functional group selected from hydroxysilane and alkoxysilane groups to be introduced into the resin is small, a compound or resin containing at least two functional groups selected from hydroxysilane and alkoxysilane groups per molecule and being free from a cationic group may be used in combination as an external curing agent. Alternatively, a compound or resin containing at least two epoxide groups (especially cycloaliphatic epoxide groups), N-methylol groups or low temperature-dissociable blocked isocyanate groups (especially oxime-blocked isocyanate groups) may be used in combination.

It is also possible to make up for curability by introducing the above-mentioned epoxide groups, N-methylol group or low temperature-dissociable blocked isocyanate groups into the resin used in this invention. In either case, the presence of the hdyroxysilane group or the alkoxysilane group makes it possible to improve the adhesion and corrosion resistance of the coated film obtained by low-temperature curing.

Elecrodeposition coating from the aqueous paint resin composition of this invention comprising an aqueous dispersion of a resin containing an ionic group, preferably a cationic group, and a functional group selected from hydroxysilane and alkoxysillane groups may be carried out by using electrodeposition coating methods known per se.

Specifically, a pigment, a solvent, a surface-active agent, etc. are added as required to the above aqueous dispersion, and the mixture is diluted with water to a solids content of generally about 5 to 25% by weight. A cathode and a conductive article to be coated are immersed in the resulting aqueous electrodeposition coating bath. By passing current through the bath, an electrodeposited film is obtained on the article to be coated. Electrodeposition may generally be carried out at a voltage of 50 to 500 V for a period of 30 seconds to 5 minutes.

After an electrodeposited film of a required thickness is obtained, the article is dried by a suitable method in a baking oven or an infrared heater, for example, at a temperature of 80° to 150° C., preferably 100° to 140° C., after optionally washing it with water. As a result, the electrodeposited film is heat-melted and can be changed to a smooth uniform cured film. The article to be coated may be any conductive substrate, but the method of this invention is especially suitable for electrodeposition coating of metallic substrates such as steel, aluminum and copper.

The water-base paint resin composition of this invention is most suitable for electrodeposition coating as stated above, but can also be applied to dip coating, flow coating, roller coating, etc.

The following Examples illustrate the present invention more specifically. It should be understood, however, that the invention is not limited to these specific examples.

EXAMPLE 1

A resin to be used in this invention was produced in accordance with the following recipe.

| Component | Parts by weight |
|---|---|
| isopropanol | 400 |
| styrene | 375 |
| 2-ethylhexyl acrylate | 375 |
| 2-hydroxyethyl acrylate | 125 |
| acrylic acid | 75 |
| gamma-methacryloxypropyl-triisopropoxysilane | 75 |

| Component | Parts by weight |
|---|---|
| azobisisobutyronitrile | 30 |
| isopropanol | 150 |
| azobisdimethylvaleronitrile | 10 |
| acetylacetone | 250 |

First, isopropanol was charged into a suitable reaction vessel and heated to 85° C. A mixture of styrene, 2-ethylhexyl acrylate, 2-hydroxyethyl acrylate, acrylic acid, gamma-methacryloxypropyltriisopropoxysilane and azobisisobutyronitrile was added over the course of about 3 hours. The reaction mixture was aged for about 1 hour. Azobisdimethylvaleronitrile was dissolved in isopropanol, and the solution was added over the course of about 1 hour. The reaction mixture was further aged for 2 hours to form a resin solution. Finally, acetylacetone was added, and the resin solution was diluted. 180 Parts of the resulting resin solution was taken, and 1 part of titanium oxyacetylacetonate was added, and the mixture was gradually added with stirring to 211 parts of deionized water and 9 parts of triethylamine to form an aqueous dispersion having a resin solids content of 25%. The dispersion was diluted with 400 parts of deionized water to form an electrodeposition coating bath having a solids content of 12.5%. An anodized aluminum plate was electrodeposited in bath at a bath temperature of 25° C. and a voltage of 100 V for 2 minutes, and dried at 100° C. for 20 minutes to give a hard, acetone-resistant continuous coated film.

EXAMPLE 2

A resin to be used in this invention was produced in accordance with the following recipe in the same way as in Example 1.

| Component | Parts by weight |
|---|---|
| isopropanol | 400 |
| methyl methacrylate | 200 |
| 2-ethylhexyl methacrylate | 400 |
| 2-hydroxyethyl methacrylate | 125 |
| dimethylaminoethyl methacrylate | 175 |
| gamma-methacryloxypropyl-ethoxysilane | 100 |
| azobisisobutyronitrile | 40 |
| isopropanol | 200 |
| azobisisobutyronitrile | 10 |
| acetylacetone | 200 |

180 Parts of the resulting resin solution was taken, and with stirring, put in 217 parts of deionized water and 3 parts of acetic acid to form an aqueous dispersion having a resin solids content of 25%. The aqueous dispersion was milled with 20 parts of titanium dioxide pigment and 2 parts of amorphous hydrous silicon dioxide pigment, and the mixture was diluted with 378 parts of deionized water to prepare an electrodeposition coating bath having a solids content of 15%. A zinc phosphate-treated steel panel was electrodeposited in the electrodeposition coating bath at a bath temperature of 28° C. and a voltage of 150 V for 3 minutes, and heated at 120° C. for 30 minutes to obtain a lustrous, hard, acetone-resistant smooth white coated film on the panel.

EXAMPLE 3

A resin composition in accordance with this invention was produced in accordance with the following recipe.

| Component | Parts by weight |
|---|---|
| Epon 1004 (*1) | 1900 |
| methyl isobutyl ketone | 383 |
| gamma-isocyanatopropyl-tributoxysilane | 466 |
| ethylene glycol monobutyl ether | 383 |
| acetylacetone | 255 |
| diethanolamine | 189 |

(*1) An epoxy resin having an epoxy equivalent of about 950 obtained from bisphenol A and epichlorohydrin (a tradename for a product of Yuka Shell Co., Ltd.).

Epon 1004 was dissolved under heat in methyl isobutyl ketone, and gamma-isocyanatopropyltriethylsilane was added at 90° C. and reacted until no absorption of the isocyanate group was detected by infrared spectroscopy. The reaction mixture was diluted with ethylene glycol monobutyl ether and acetylacetone, and diethanolamine was added to 70° C. The reaction was continued until the reaction product had a tertiary amine value (*2) of about 40 (theoretical value).

130 Parts of the resulting resin was taken, and a mixture of 197 parts of deionized water containing 1.0 part of lead acetate and 1.6 parts of acetic acid was gradually put into it to obtain a stable emulsion having a solids content of about 30% and a pH of about 6. The emulsion was diluted with deionized water to a solids content of 15%. A zinc phosphate-treated steel panel was electrodeposited in the resulting bath at a bath temperature of 30° C. and a voltage of 200 V for 3 minutes, and then heated at 130° C. for 30 minutes to give a lustrous, hard, acetone-resistant coated film having a thickness of 17 microns on the steel panel. The coated panel showed an outstanding salt spray resistance (more than 1500 hours).

(*2): The primary and secondary amino groups were amidated by treating the sample with acetic anhydride, and then the tertiary amino group was quantitatively analyzed with N/10 perchloric acid/acetic solution.

EXAMPLE 4

A resin composition in accordance with this invention was produced in accordance with the following recipe.

| Component | Parts by weight |
|---|---|
| Glyci-ale BPP-350 (*3) | 525 |
| bisphenol A | 342 |
| 75% methyl isobutyl ketone solution of monoethanolamine/methylisobutylketoneketimine | 23.8 |
| Epon 828 EL (*4) | 665 |
| gamma-isocyanatopropylmethyl-diethoxysilane | 406 |
| Propylene glycol monomethyl ether | 424 |
| Diethanolamine | 173.3 |

(*3) Diglycidyl ether of bisphenol A/propylene oxide adduct having an epoxy equivalent of about 350 (made by Sanyo Chemical Co., Ltd.).
(*4) Diglycidyl ether of bisphenol A having an epoxy equivalent of about 190 (a product of Yuka-Shell Co., Ltd.).

(*3): Diglycidyl ether of bisphenol A/propylene oxide adduct having an epoxy equivalent of about 350 (made by Sanyo Chemical Co., Ltd.).

(*4): Diglycidyl ether of bisphenol A having an epoxy equivalent of about 190 (a product of Yuka-Shell Co., Ltd.)

Glyci-ale BPP-350, bisphenol A, and monoethanolamine/methylisobutylketoneketimine were heated to 160° C. and reacted until the epoxy groups disappeared. Epon 828EL was added, and the mixture was reacted at 140° C. until the epoxy equivalent (*5) rose to the theoretical value (775).

(*5): Measured in accordance with JIS K-7236. The amino groups are also included in calculation.

The reaction mixture was cooled to 100° C., and then gamma-isocyanatopropylmethyldiethoxysilane was added. The mixture was reacted at the above temperature until there was no absorption of the isocyanate groups by infrared spectroscopy. Then, the reaction mixture was diluted with propylene glycol monomethyl ether, and cooled to 60° C. Diethanolamine was added and the mixture was reacted until its water-soluble amine value (*6) reached less than 1.

(*6): The sample was dissolved in xylene/n-butanol/ethanol (1/1/1 by volume). The solution was extracted with a saturated aqueous solution of sodium chloride, and the amount of the extracted amine was determined by using a N/10 aqueous solution of hydrochloric acid.

120.3 Parts of the resin solution was taken, and 20 parts of acetylacetone and 2.2 parts of acetic acid were added to neutralize the resin. While deionized water (201 parts) was gradually added, the mixture was dispersed by a disper to give a good emulsion having a solids content of about 30%. Immediately then, the emulsion was diluted with deionized water to a solids content of 15%. A zinc phosphate-treated steel panel was electrodeposited in the resulting bath at a bath temperature of 22° C. and a voltage of 175 V for 3 minutes, and then baked at 130° C. for 30 minutes to form a lustrous, smooth, acetone-resistant coated film having a thickness of 26 microns on the panel. The coated panel showed an outstanding Du Pont impact strength (more than 50 cm on both surfaces under conditions of ¼ inch and 1 kg) and an outstanding salt spray resistance (more than 1500 hours).

When the electrodeposition coating bath was stored at 30° C. for one week, there was hardly any change in electrodeposition characteristics, and a smooth cured coated film could be obtained from it.

EXAMPLE 5

An isocyanate compound containing an alkoxysilane group was prepared in accordance with the following recipe.

| Material | Parts by weight |
|---|---|
| 2,4-toluene diisocyanate | 174 |
| allyl alcohol | 61 |
| chloroauric acid hexahydrate | $5.7 \times 10^{-3}$ |
| tributoxysilane | 248 |

One mole of 2,4-toluene diisocyanate was heated to 50° C., and a solution of chloroauric hexahydrate (catalytic amount) in allyl alcohol (1.05 moles) was added dropwise. The mixture was reacted at the above temperature until the isocyanate value of the reaction product was lowered to 170. Then, tributoxysilane (1 mol) was added dropwise at 80° C., and the mixture was reacted until there was no absorption (at about 2200 $cm^{-1}$) of Si-H by infrared spectroscopy to give an alkoxysilane group-containing isocyanate compound.

A resin composition in accordance with this invention was produced in accordance with the following recipe.

| Component | Parts by weight |
|---|---|
| Epon 1002 | 1260 |
| ethylene glycol dimethyl ether | 725 |
| the isocyanate compound obtained as above | 966 |
| acetylacetone | 483 |
| diethanolamine | 189 |

Epon 1002 was dissolved under heat in ethylene glycol dimethyl ether, and the isocyanate compound was added. The mixture was reacted at the same temperature until there was no absorption of the isocyanate groups by infrared spectroscopy. Then, the reaction mixture was diluted with propylene glycol monomethyl ether and cooled to 70° C. Diethanolamine was added, and the mixture was reacted until the water-soluble amine value of the product was lowered to below 1. 135 Parts of the resulting resin solution was taken and mixed with 10 parts of phenyltriethoxysilane. Two parts of lead acetate, 2.2 parts of acetic acid and 350 parts of deionized water were added to neutralize and disperse the resin in water to prepare an electrodeposition coating bath having a solids content of 20%. A test panel was electrodeposited in the electrodeposition coating bath at 200 V for 3 minutes, and baked at 130° C. for 30 minutes to form a smooth, acetone-resistant coated film having a thickness of 19 microns. The resulting coated panel showed a salt spray resistance of more than 1500 hours. Even after this electrodeposition coating bath was stored at room temperature for one month, an electrodeposited film having hardly any change in film properties could be obtained by using the stored electrodeposition coating bath.

What is claimed is:

1. A method of electrodeposition coating which comprises electrodepositing a water-base electrodeposition coating composition comprising a cationic group-containing resin as a film-forming vehicle and acetylacetone on an article to be coated and then heating the coated article to form a cured coated film, wherein the cationic group-containing resin contains a functional group selected from the group consisting of hydroxysilane and alkoxysilane groups, and can be crosslinked by the condensation reaction of the functional group, the base resin for the cationic group-containing resin being a resin containing hydroxyl group in an amount of 0.2 to 10 milliequivalents/gram of dry resin.

2. The method of claim 1 wherein the cationic group of the cationic group-containing resin is an amino group neutralized with an acid.

3. The method of claim 1 wherein said functional group is introduced into the resin via an Si-C linkage.

4. The method of claim 1 wherein the amount of the cationic group is 0.1 to 2 milliequivalents/gram of dry resin.

5. The method of claim 27 wherein the amount of said functional group is 0.2 to 20 milliequivalents/gram of dry resin.

6. An article coated by the method of claim 1.

7. The method of claim 1 wherein the base resin for the ionic group-containing resin is an epoxy resin or an acrylic resin.

8. A resin composition for a water-base paint which comprises a resin containing a cationic group and a functional group selected from hydroxysilane and alkoxysilane groups as a film-forming vehicle and acetylacetone, the base resin for the cationic group-containing resin being a resin containing hydroxyl group in an amount of 0.2 to 10 milliequivalents/gram of dry resin.

9. The composition of claim 8 wherein the resin is cured under heat by the condensation of said functional group.

10. The composition of claim 8 wherein the cationic group is an amino group neutralized with an acid.

11. The composition of claim 8 wherein said functional group is introduced into the resin via an Si-C linkage.

12. The composition of claim 8 wherein the amount of the cationic group is 0.1 to 2 milliequivalents/gram of dry resin.

13. The composition of claim 8 wherein the amount of said functional group is 0.2 to 20 milliequivalents/gram of dry resin.

14. The composition of claim 8 wherein the resin is an epoxy resin or an acrylic resin.

* * * * *